United States Patent [19]
Diaz

[11] Patent Number: 5,837,295
[45] Date of Patent: Nov. 17, 1998

[54] SCRAPER BLADES FOR EXTRUDER

[75] Inventor: Ramon Alberto Diaz, Beaumont, Tex.

[73] Assignee: The Goodyear Tire & Rubber Company, Akron, Ohio

[21] Appl. No.: 951,223

[22] Filed: Oct. 16, 1997

[51] Int. Cl.[6] .................................................. B29C 47/38
[52] U.S. Cl. ........................ 425/207; 425/200; 425/209; 425/382.3; 366/79; 366/81
[58] Field of Search ..................... 425/200, 209, 425/225, 227, 202, 207, DIG. 46, 382.3, 382 R; 366/79, 81

[56] References Cited

U.S. PATENT DOCUMENTS

| | | | |
|---|---|---|---|
| 3,605,186 | 9/1971 | Wagner | 425/202 |
| 4,365,946 | 12/1982 | Anders | 425/382.3 |
| 4,541,982 | 9/1985 | Upmeier | 425/207 |
| 4,881,886 | 11/1989 | Neuman | 425/382.3 |
| 4,958,933 | 9/1990 | Zakich | 366/83 |
| 5,000,900 | 3/1991 | Baumgartner | 425/382.3 |
| 5,129,729 | 7/1992 | Geyer | 425/207 |
| 5,153,009 | 10/1992 | Voigt | 425/207 |
| 5,158,784 | 10/1992 | Semmekvot | 425/382.3 |

*Primary Examiner*—Khanh P Nguyen
*Attorney, Agent, or Firm*—David E Wheeler

[57] ABSTRACT

Angled scraper blades provided on the end of a screw shaft of an extruder provide thrust for propelling polymer toward the die opening of the extruder. The scraper blades help prevent trapping of polymer between the shaft and the die plate of the extruder, which trapping can lead to scorching, burning or break down of the polymer.

5 Claims, 4 Drawing Sheets

SCRAPER BLADES FOR EXTRUDER

BACKGROUND OF THE INVENTION

This invention relates to improvements in material transport in a screw type extruder.

Screw type extruders may be used for masticating and mixing polymer compositions such as plastics and rubbers, and in the finishing process, for drying rubber. Raw materials are added in one end of an extruder housing and said materials are broken up and mixed as they are transported by the flight of the screw shaft toward a die opening in the opposite end of the housing. Those skilled in the art carefully watch the viscosity of the composition and screw speed in relation to the physical properties of the composition since the mixing generates heat, and excessive heat may cause breakdown, burning or decomposition of the polymer being mixed.

In some processes, water is used as a carrier between the reactor and the rubber finishing operation, and a screw type extruder is used to dry the rubber. The drying action is accomplished by masticating the rubber to release trapped moisture, and the released moisture is evaporated by the generally high mixing temperatures.

In some prior art extruders, the end of the shaft next to the die plate is equipped with a scraper blade, extending beyond the end of the shaft and oriented parallel to the length direction of the shaft (i.e. perpendicular to the flat surface of the end of the shaft) to help scrape the mixed polymer trapped between the end of the shaft and the die plate of the extruder away from the die plate, and to help force the mixed polymer into the die opening in the die plate. Such prior art scrapers push the polymer radially outward and do not provide any forward impetus to the mixed polymer, but rely on a continuous flow of polymer from the extruder to keep extrudate flowing through the die opening.

Sometimes, and more frequently as the scraper becomes worn, portions of the polymer composition become trapped between the die plate and the shaft, and the continuous turning of the shaft against the polymer generates friction and overheating of the polymer until it decomposes. This decomposition may manifest itself in the creation of a gel or oil, or scorching or burning of the composition, which may contaminate the product or create packaging and shipping problems.

The problem is particularly noticeable when there is no scraper blade. In one instance, a Goodyear maintenance supervisor in Korea, where no parts were available improvised a scraper blade by cutting a piece of pipe in four pieces (each section comprising 90° of the 360° circumference of the pipe) and welding the sections to the end of the cap screw at an angle of 90° relative to the face of the cap screw, to function as a scraper blade.

It is an object of this invention to provide a more uniform extrudate product by providing more consistent and uniform extrudate progression from a screw type extruder, especially between the extruder shaft and the die opening.

SUMMARY OF THE INVENTION

A screw type extruder comprises a housing containing a rotatable shaft with flights for transporting and masticating, or drying a polymer composition and extruding the composition through a die plate having a die opening attached to an end of the housing. The improvement to the extruder comprises a plurality of scraper blades having an angle of 30° to 60° relative to an end surface of the shaft for propelling polymer composition through the die opening and preventing trapping and decomposition of polymer between the die plate and the shaft. The scraper blades are welded to a face of a cap screw in the end of the extruder shaft.

In an illustrated embodiment, four said scraper blades are used wherein the scraper blades disposed at 90° angles relative to each other.

In another illustration of the invention, scraper blades are mounted on the end of the shaft to have an angle of 45° relative to the end surface of said shaft.

As illustrated, the scraper blades are 90° angle irons wherein legs thereof are welded to the face of said cap screw.

DETAILED DESCRIPTION OF THE INVENTION

Figure 1:
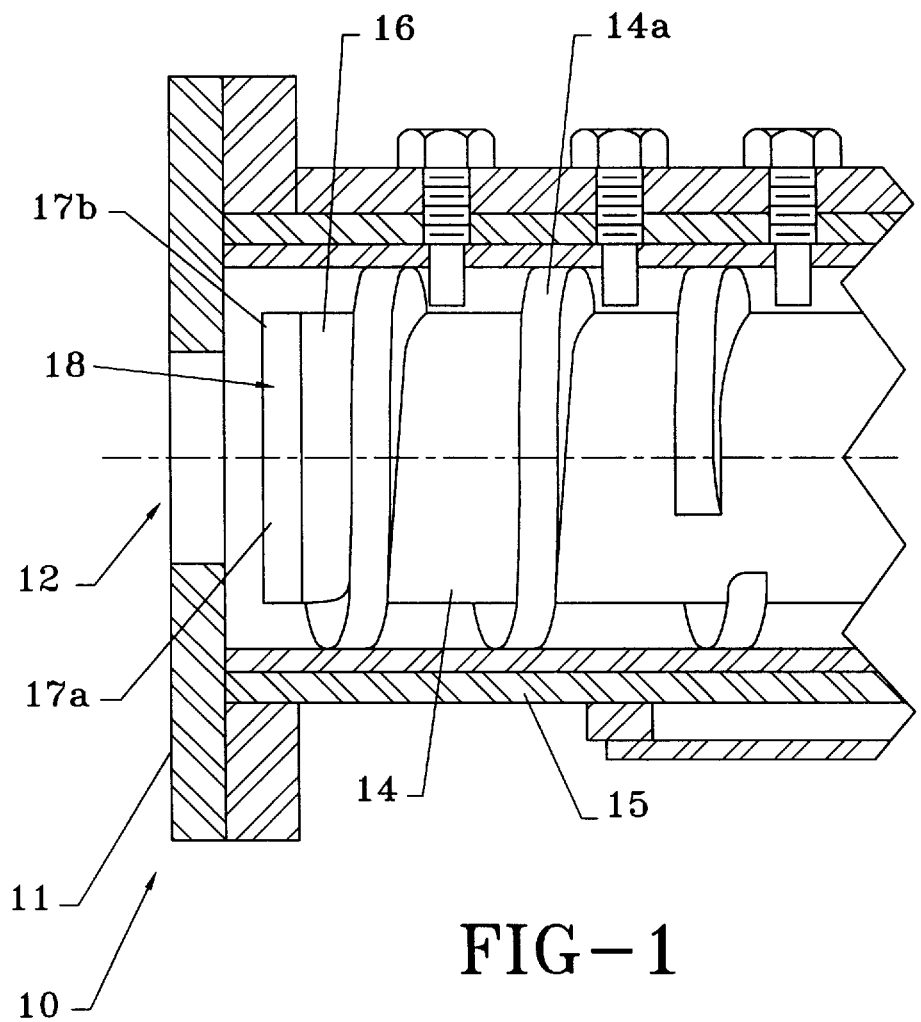
FIG. 1 illustrates a cutaway side view of the extruding end of a screw type extruder of the invention.

With reference now to FIG. 1, an extrusion end 10 of a screw type extruder is illustrated showing housing 15 containing a screw which comprises shaft 14 having flights 14a. Flights 14a are configured to move polymer composition masticated in the extruder toward die plate 11 and die opening 12. Expander cap screw 16 is placed in the end of shaft 14 and is provided for easy replacement of prior art scraper blades which attach to the cap screw and are subject to greater wear than other parts of the extruder. In the invention, angled scraper blade 18 is attached to cap screw 16.

In the illustrated embodiment, the flights 14a on shaft 14 are oriented such that polymer composition in the extruder is propelled toward die plate 11 when shaft 14 is rotated counterclockwise.

Angled scraper blade 18 is oriented to propel extrudate toward die opening 12. Those skilled in the art will recognize that a single angled blade mounted on a circular rotating shaft will provide a forward vector in one half of the rotation and a backward vector in the other half of the rotation. Accordingly, the two parts 17a, 17b of scraper blade 18 are angled in opposite directions so that both of 17a, 17b provide a forward impetus, i.e. motion toward die opening 12, to polymer composition they make contact with. In other words, blade portions 17a and 17b will both be angled to face counterclockwise.

Figure 2:
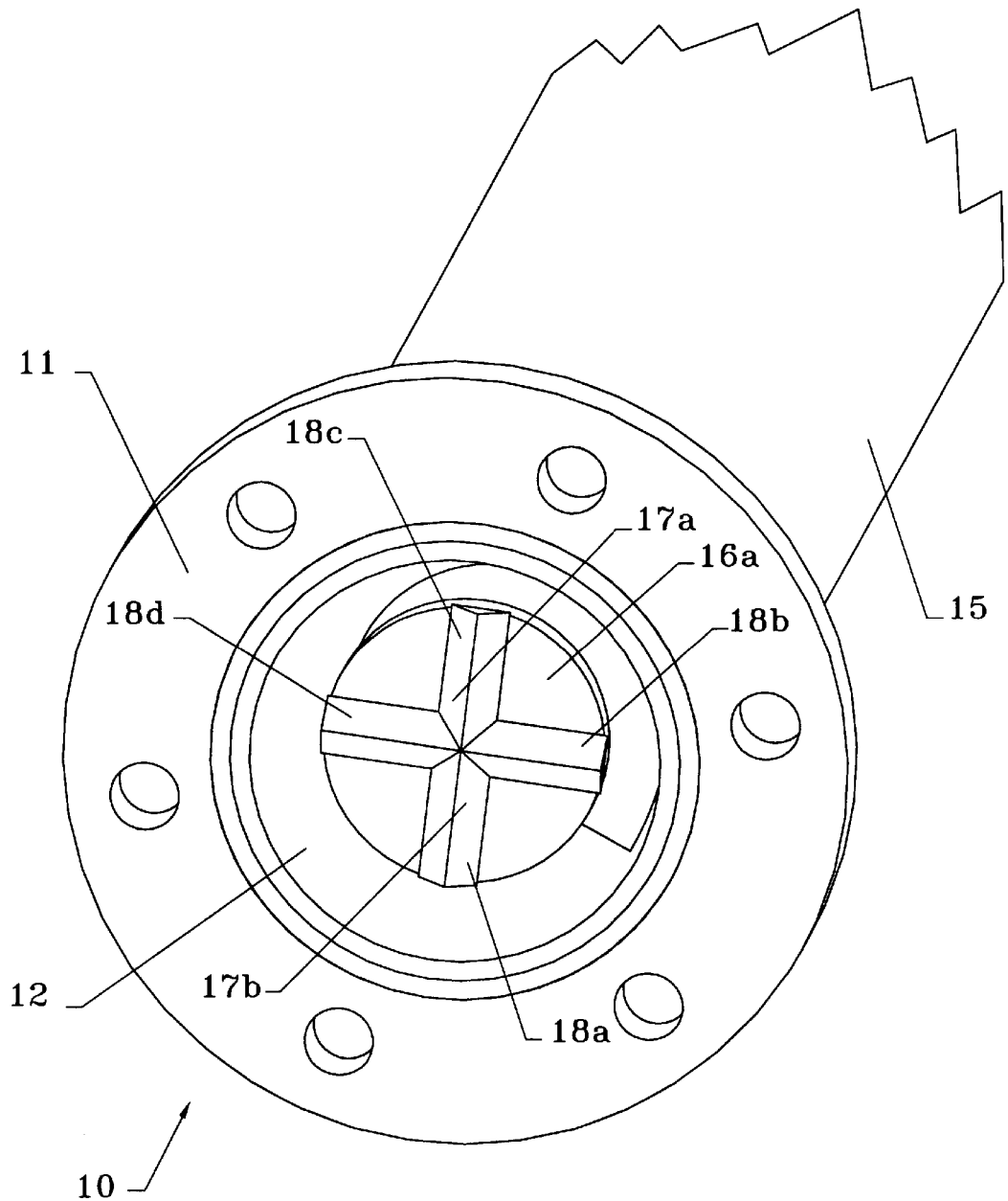
FIG. 2 illustrates a perspective end view of the extruding end of a screw type extruder of the invention.

With reference now to FIG. 2, in one illustrated embodiment of the invention, scraper blades 18 may be provided in the form of four separate blades 18a, 18b, 18c, 18d which are welded at 90° angles relative to each other on the face 16a of cap screw 16. In the illustrated embodiment, four pieces of 90° angle iron are used for the scraper blades since the angle iron is easy to work with and may easily be attached to cap screw 16 by welding legs 19 (see FIG. 3) directly to cap screw 16. Surfaces 17a and 17b represent the surfaces that provide the forward vector for the scraper blades, and those skilled in the art will recognize that a flat scraper blade, welded at the proper angle, can be used in place of the angle iron.

Figure 3:
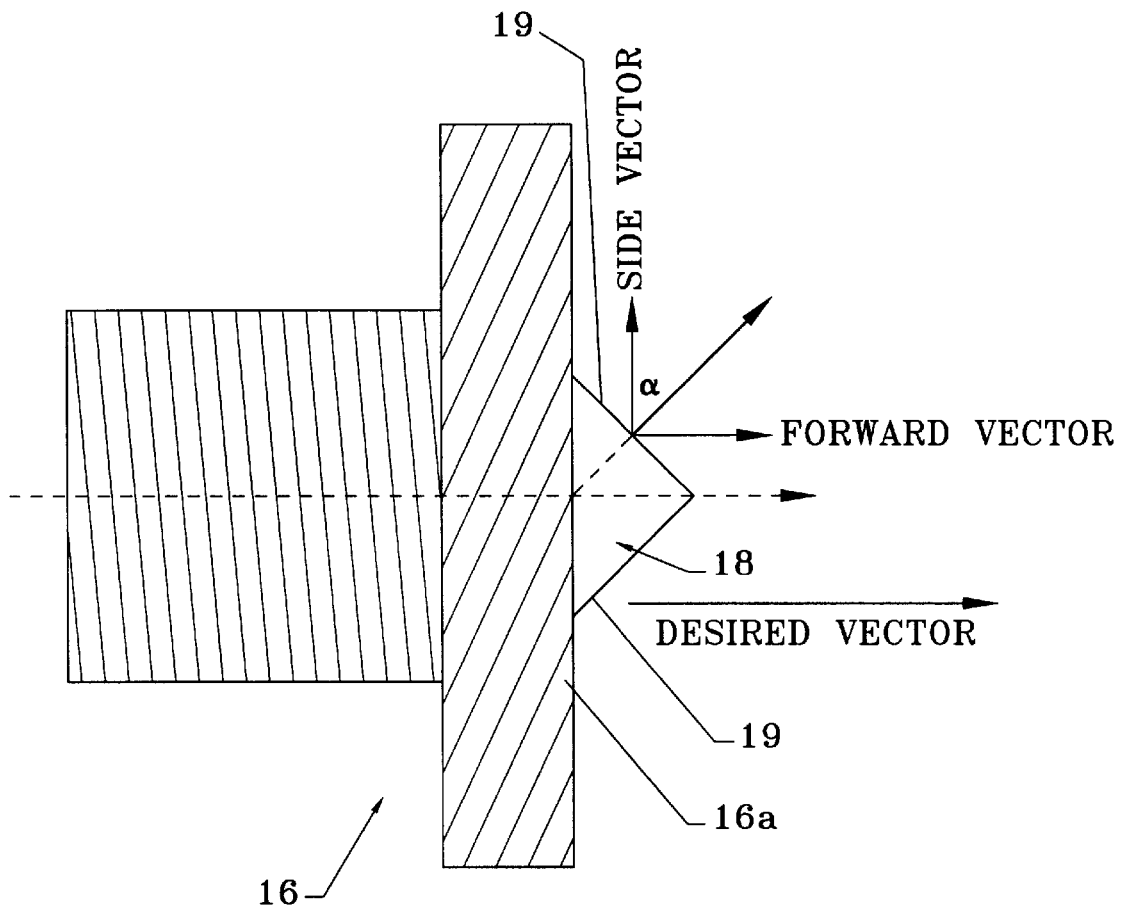
FIG. 3 illustrates a modified cap screw adapted for placement in the end of a screw shaft for a screw type extruder.

With reference to FIG. 3, since 90° angle iron is used in the illustrated embodiment, the angle α of the scraper blade 18 with respect to face 16a of the cap screw is 45°. The inventors believe that suitable angles α for the scraper blade, to provide a forward vector that will push extrudate in the desired direction and prevent burning and scorching of the polymer extrudate, can be between 30° and 60°.

Figure 4:
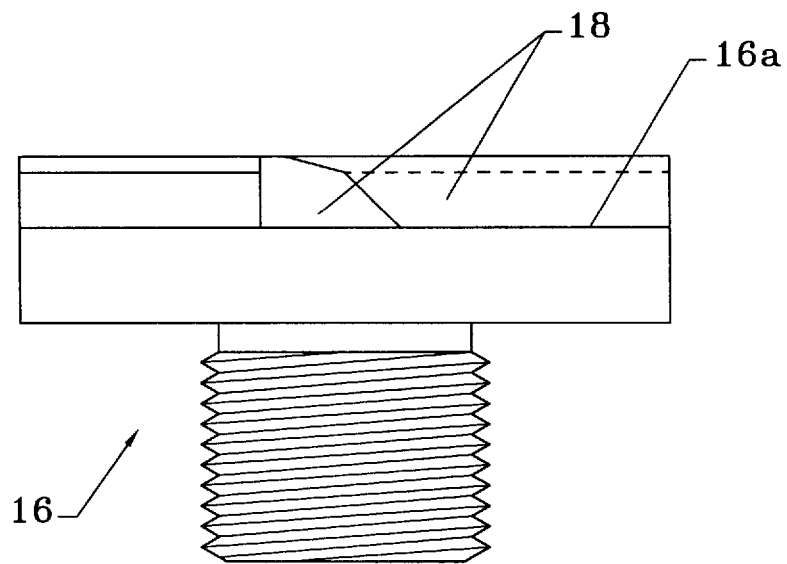
FIGS. 4 and 4a illustrate machine type drawings of side and end views of one embodiment of a modified cap screw of the invention.
Figure 4A:
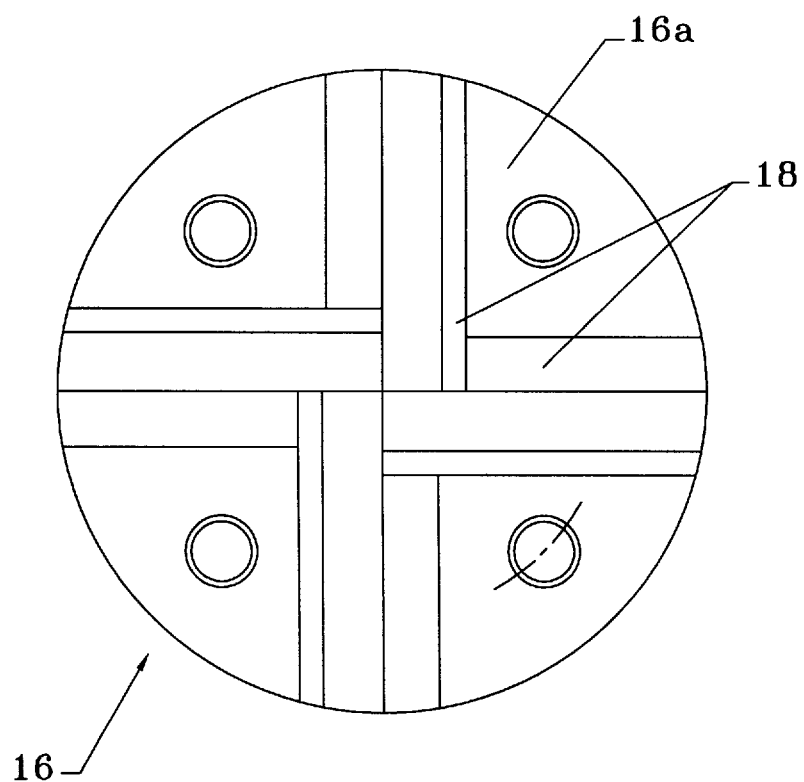

With reference now to FIGS. 4 and 4a, machine drawing type illustrations of the invention are provided that illustrate one means of providing an interlocking structure using four angle iron scraper blades 18.

Those skilled in the art will recognize that any number of scraper blades can be used in the invention, and the number of scraper blades may be changed depending on the viscosity, temperature and physical properties of the polymer which is extruded. The inventors have tested the invention with three and four scraper blades, and the use of one to eight scraper blades will be most beneficial.

While the invention has been specifically illustrated and described, those skilled in the art will recognize that the invention can be variously modified and practiced. The invention is limited only by the following claims.

What is claimed is:

1. A screw type extruder comprising a housing containing a rotatable shaft with flights for transporting and masticating, or drying a polymer composition and extruding said composition through a die plate having a die opening attached to an end of said housing, the improvement comprising a plurality of scraper blades having an angle of 30° to 60° relative to an end surface of said shaft for propelling polymer composition through the die opening and preventing trapping and decomposition of polymer between the die plate and the shaft.

2. The extruder of claim 1 wherein said scraper blades are welded to a face of a cap screw in the end of the extruder shaft.

3. The extruder of claim 1 wherein four said scraper blades are used, said scraper blades being disposed at 90° angles relative to each other.

4. The extruder of claim 1 wherein said scraper blades have an angle of 45° relative to the end surface of said shaft.

5. The extruder of claim 2 wherein said scraper blades are 90° angle irons wherein legs thereof are welded to the face of said cap screw.

* * * * *